United States Patent [19]

Baik

[11] Patent Number: 5,091,686
[45] Date of Patent: Feb. 25, 1992

[54] OPERATION CONTROL CIRCUIT FOR PUMP MOTOR

[75] Inventor: Woo S. Baik, Busan, Rep. of Korea

[73] Assignee: Gold Star Co., Ltd., Rep. of Korea

[21] Appl. No.: 589,326

[22] Filed: Sep. 27, 1990

[30] Foreign Application Priority Data

Sep. 29, 1989 [KR] Rep. of Korea .............. 14063/1989

[51] Int. Cl.$^5$ .............................................. H02P 5/40
[52] U.S. Cl. ...................................... 318/798; 361/24; 417/33
[58] Field of Search ........... 363/25, 24, 28, 29, 363/30, 31; 318/798, 806; 417/12, 14, 18, 32, 33

[56] References Cited

U.S. PATENT DOCUMENTS

| | | | |
|---|---|---|---|
| 4,000,446 | 12/1976 | Vandevier et al. | 361/31 |
| 4,007,401 | 2/1977 | Kimmel et al. | 361/31 |
| 4,021,700 | 5/1977 | Ellis-Anwyl | 361/31 |
| 4,044,288 | 8/1977 | Godfrey | 361/25 |
| 4,327,391 | 4/1982 | Grzebielski | 361/31 |

Primary Examiner—David Smith, Jr.
Attorney, Agent, or Firm—Ostrolenk, Faber, Gerb & Soffen

[57] ABSTRACT

An operation control circuit for pump motor which is made such that driving condition of pump motor is checked and then when its driving condition is abnormal than driving of the pump motor can be stopped.

The operation control circuit includes a pump environmental temperature detecting and heater energizing section, an overload and no-load detecting section, an overload driving count section, a no-load driving count section, latch sections, a reset section, a pump motor driving control section, and an operating state display section.

According to the invention, using life time can be extended by preventing overload and no-load operation of pump motor, and freezing break down of pump motor can previously be prevented, and opening and closing noise of switch can be reduced.

7 Claims, 1 Drawing Sheet

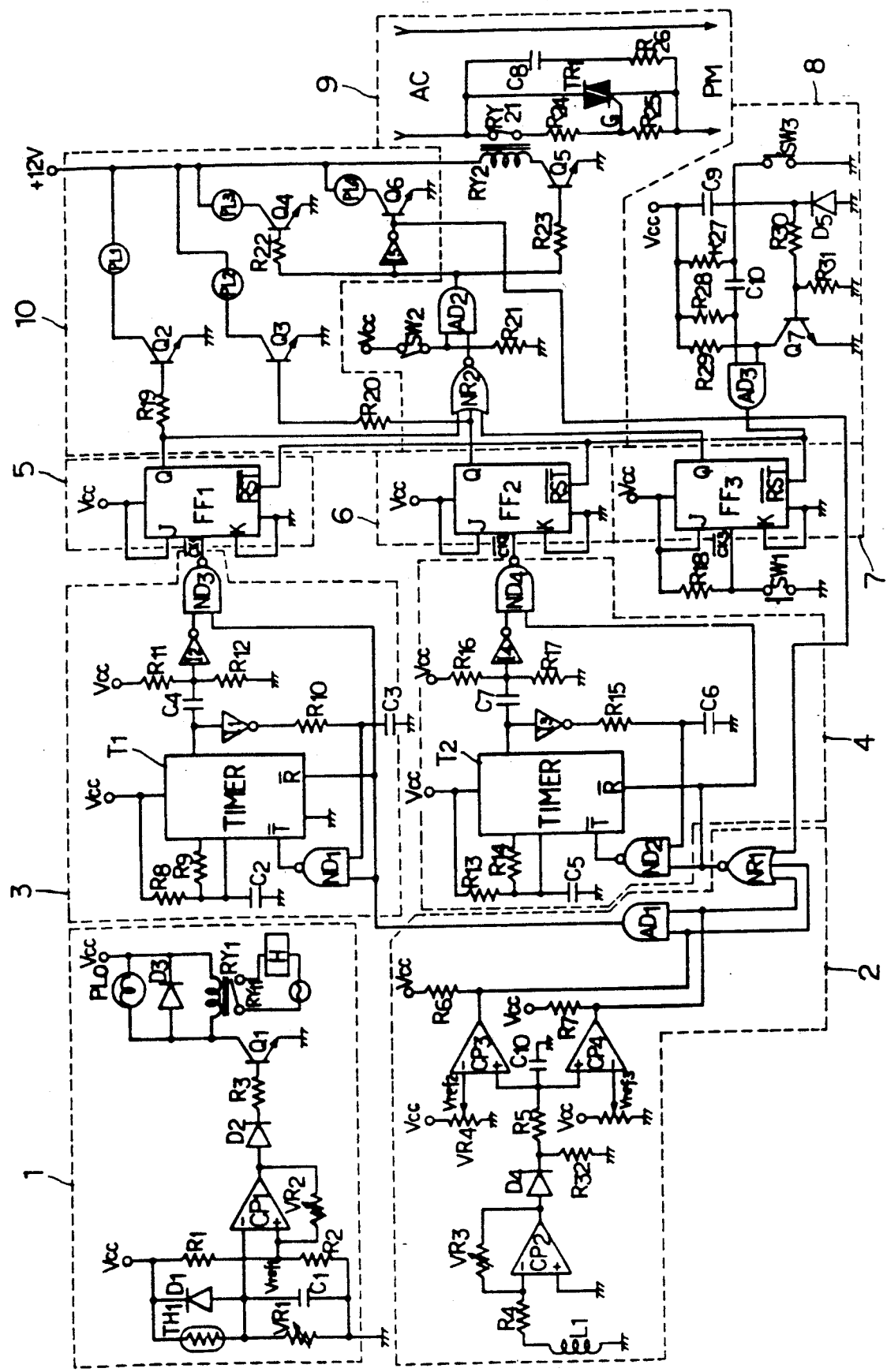

OPERATION CONTROL CIRCUIT FOR PUMP MOTOR

BACKGROUND OF THE INVENTION

The present invention relates to a driving control circuit for a pump motor widely used for boilers and the like, and more particularly to an operation control circuit for a pump motor which is made such that the driving condition of pump motor is checked and when its driving condition is abnormal then driving of the pump motor can be stopped.

Generally, the pump motor has worry to be broken by freezing in case when its environmental temperature is dropped below zero degree of centigrade, and when said pump motor is driven at a state that either the pump motor is overloaded or no-loaded, not only the using life time of said pump motor is reduced but also there has been a worry that said pump motor is broken down in severe case.

SUMMARY OF THE INVENTION

Therefore, it is an object of the present invention to provide an operation control circuit for a pump motor in which environmental temperature of pump motor is maintained above zero degree of centigrade, and in case when an overload or a no-load is applied more than a predetermined time period to the pump motor during driving condition of said pump motor, the driving of said pump motor can be stopped.

The object of the present invention is accomplished by such a manner that in case when the environmental temperature of the pump motor is dropped below zero degree of centigrade, it is detected and then heater is energized by its detected signal whereby the environmental temperature of the pump motor is maintained above zero degree of centigrade, and current flowed to the pump motor during driving condition of the pump motor is detected with voltage, and in case when said detected voltage is maintained at more or less of predetermined value than appropriate voltage according to the normal operation of the pump motor, the driving of said pump motor is stopped.

BRIEF DESCRIPTION OF THE DRAWINGS

Accompanying single drawing is a diagram of an operation control circuit for a pump motor according to the present invention.

DETAILED DESCRIPTION OF THE INVENTION

Hereinafter, the present invention will be described in detail with reference to the accompanying drawing.

The operation control circuit for a pump motor according to the present invention comprises a pump environmental temperature detecting and heater driving section 1 which detects the temperature of pump environment whereby driving a heater in case when said detected temperature becomes below zero degree of centigrade; an overload and no-load detecting section 2 which detects the current flowed to the pump motor PM into voltage and then comparing said detected voltage with an over-load reference voltage and a no-load reference voltage whereby detecting an overload and no-load condition; an overload driving count section 3 which outputs an overload driving stop control signal, in case when an overload detection signal is outputted from said overload and no-load detecting section 2, counting its time period; a no-load driving count section 4 which outputs a no-load driving stop control signal, in case when the no-load detection signal is outputted from said over-load and no-load detecting section 2, counting its time period; latch sections 5 and 6 for latching respectively an overload driving stop control signal of said overload driving count section 3 and a no-load driving stop control signal of said no-load driving count section 4; a latch section 7 for latching the driving stop control signal according the short-circuit of a driving stop switch SW1; a reset section 8 for resetting said latch sections 5, 6 and 7 by outputting reset pulse signal either at initial time that power is supplied or at the time of short-circuit of a re-start switch SW3; a pump motor driving control section 9 for driving a pump motor PM by short-circuit of a pressure switch SW2 at the time of resetting said latch sections 5, 6 and 7; and an operating condition display section 10 for displaying the operating condition of said pump motor PM according to the output signal of said latch sections 5, 6 and the driving control signal of said pump motor driving control section 9.

Operation and effect of the present invention constructed will be described in detail hereinafter.

When a power is applied to the power terminal Vcc, said power supply voltage is divided at resistors R1 and R2 whereby being applied to a non-inversion input terminal of comparator CP1 as a reference voltage Vref1, and being divided at a temperature detecting thermister TH1 and a variable resistor VR1 whereby being applied to an inversion input terminal of said comparator CP1 as a comparison voltage.

Here, the temperature detecting thermister TH1 is a negative characteristic element, and the lower the temperature the greater the internal resistance value of it.

Therefore, when comparison voltage according to the thermister TH1 and variable resistor VR1 at 0° C. is set slightly lower than the reference voltage Vref1 according to the resistors R1 and R2 in case when the environmental temperature of the pump motor PM is dropped below 0° C., the comparison voltage applied to the inversion input terminal of the comparator CP1 becomes lower than the reference voltage Vref1 applied to its non-inversion input terminal and thereby high potential signal is outputted to an output terminal of said comparator CP1, and since this high potential signal makes transistor Q1 to be conductive through diode D2 and resistor R3, a heater driving relay RY1 connected to its collector is energized, according to this, since a switch RY11 of said heater driving relay RY1 is short-circuited, heater H is energized whereby the environmental temperature of the pump motor PM is raised up. And, at this moment, heater driven display lamp PLO is lighted according to the conduction of said transistor Q1 whereby the driven condition of said heater H is displayed.

On the other hand, at initial condition that power is supplied to the power supply terminal Vcc, since said power supply is differentiated by capacitor C9, diode D5 and resistors R30 and R31 whereby transistor Q7 becomes conductive, a low potential signal is outputted to its collector, and since this low potential signal is applied to one input terminal of AND gate AD3, a low potential signal is outputted from said AND gate AD3 whereby flip-flops FF1, FF2 and FF3 of the latch sections 5, 6 and 7 are made to be reset.

Thus, at the initial condition that the power is supplied, since a low potential pulse signal which is a reset signal is outputted from the reset section 8 whereby the latch sections 5, 6 and 7 are made to be reset, low potential signals are outputted to all of output terminals Q of said latch sections 5, 6 and 7.

Therefore, at this moment, transistors Q2 and Q3 of the operating condition display section 10 maintain OFF states whereby overload operating condition display latch PL1 and no-load operating condition display lamp PL2 are turned off.

And, at this moment, high potential signal is outputted from NOR gate NR2 according to the low potential signals outputted from said latch sections 5, 6 and 7 whereby being applied to input terminal of AND gate AD2, at this moment, when an outlet valve of the pump is opened, since pressure within tube is lowered whereby pressure switch SW2 becomes short-circuited, the power of the power supply terminal Vcc is applied through said pressure switch SW2 to other input terminal of AND gate AD2, according to this, a high potential signal is outputted from said AND gate AD2.

Since this high potential signal makes transistor Q5 conductive through resistor R23, a relay RY2 for the pump motor is energized whereby its switch RY21 is short-circuited, at this moment, since a gate current is flowed to a gate G of triac TR1 through the switch RY21 of the relay RY2 and resistor R24, said triac TR1 becomes conductive Therefore, at this moment, alternating current is supplied to the pump motor PM through said triac TR1 whereby the pump motor PM is energized.

And, at this moment, since a high potential signal outputted from said AND gate AD2 makes transistor Q4 conductive through resistor R22, a normal operating condition display lamp PL3 is lighted whereby operating condition of the pump motor PM is displayed, and a high potential signal outputted from said AND gate AD2 is inverted to low potential signal at an inverter 15 whereby being applied to input terminal of NOR gate NR1 and simultaneously making transistor Q6 to be turned off whereby driving stop display lamp PL4 becomes maintained to a turned off state.

On the other hand, according as the pump motor PM is driven, a current flowed to the pump motor PM is detected and thereafter converted to a voltage by resistor R4, variable resistor VR3 and comparator CP2 whereby being outputted, and said output voltage is charged through diode D4 and resistors R32 and R5 to capacitor C10 and then being applied to a non-inversion input terminals of comparators CP3 and CP4 as a comparison voltage. As a result, comparison voltage applied to the non-inversion input terminal of said comparators CP3 and CP4 is proportional to the current flowed to the pump motor PM, and in case when an overload is applied, its comparison voltage becomes larger, and in case when a no-load load is applied, its comparison voltage becomes less.

Therefore, when a rated load is applied to the pump motor PM and a normal current is flowed, as aforementioned, relative to the comparison voltage applied to the non-inversion input terminal of the comparators CP3 and CP4, when a no-load reference voltage Vref2 applied to the inversion input terminal of the comparators CP3 is set a little lower, and an overload reference voltage Vref3 applied to the inversion input terminal of the comparator CP4 is set a little higher, in case when a rated load is applied to the pump motor PM, the comparison voltage applied to the non-inversion input terminal of the comparator CP3 becomes higher than the reference voltage Vref2 applied to its inversion input terminal and thereby a high potential signal is outputted from said comparator CP3, and at this moment, the comparison voltage applied to the non-inversion input terminal of the comparator CP4 becomes lower than the reference voltage Vref3 applied to its inversion input terminal and thereby a low potential signal is outputted from said comparator CP4.

Therefore, at this moment, since a low potential signal is outputted from AND gate AD1 whereby being applied to reset terminal R of timer T1 of the overload driving count section 3, said timer T1 maintains reset state whereby a low potential signal is continuously outputted to its output terminal, and at this moment, a low potential signal outputted from said AND gate AD1 is applied to input terminal of NAND gate ND3 whereby a high potential signal is continuously outputted to its output terminal, according to this, the flip-flop FF1 of the latch section 5 is not clocked whereby low potential signal is continuously outputted to its output terminal.

And, since a low potential signal is outputted from NOR gate NR1 according to the high potential signal outputted from said comparator CP3, the timer T2 of the no-load driving count section 4 maintains reset state as same as said overload driving count section 3 and simultaneously a high potential signal is continuously outputted from NAND gate ND4, according to this, the flip-flop FF2 of the latch section 6 is not clocked whereby a low potential signal is continuously outputted to its output terminal Q.

Thus, since a low potential signal is continuously outputted from the latch sections 5 and 6 in case when a normal current is flowed to the pump motor PM, said pump motor PM is continuously driven.

On the other hand, n case when a no-load is applied to the pump motor PM, since a comparison voltage applied to non-inversion input terminals of the comparators CP3 and CP4 is lowered than the reference voltages Vref2 and Vref3, low potential signals are outputted from said comparators CP3 and CP4, and at this moment, since a low potential is being outputted from the inverter 15, a high potential signal which is a no-load detecting signal is outputted from the NOR gate NR1. Since this high potential signal is applied to the reset terminal R of the timer T2, said timer T2 is released from the reset state, and a low potential signal outputted from the timer T2 is inverted to high potential at the inverter I3 and thereafter being charged through a resistor R15 to a capacitor C6 whereby being applied t other terminal of the NAND gate ND2, and since a high potential signal outputted from said NOR gate NR1 is applied to one input terminal of said NAND gate ND2, a low potential signal is outputted from said NAND gate ND2 whereby becoming to trigger the timer T2. According to this, when a rated load is not applied to the pump motor PM within a time constant (approximately 10 seconds according to the resistor R13 and capacitor C5 for said timer T2, that is, when a high potential signal which is a no-load detecting signal is outputted from the NOR gate NR1 as aforementioned whereby a low potential signal is continuously outputted during the time constant of said resistor R13 and capacitor C5 from the NAND gate ND2, a high potential signal is outputted from said timer T2, and at the moment that this high potential signal is outputted, a low potential signal is applied through a capacitor C7 to the inverter I4, and thereby a high potential signal is outputted from said inverter I4, and this high potential signal is applied to one input terminal of NAND gate ND4. And, at this moment, as in above description, since a high potential signal outputted from the NOR gate NR1 is being applied to other input terminal of said NAND gate ND4, a low potential signal is outputted from said NAND gate ND4 whereby clock signal is applied to the flip-flop FF2 of the latch section 6, according to this, a high potential signal is outputted to the output terminal Q of said flip-flop FF2 Since this high potential signal makes the transistor Q3 conductive, the no-load operating state display lamp PL2 is lighted on whereby displaying that it is no-load operating state.

And, a low potential signal is outputted from NOR gate NR2 according to the high potential signal outputted to the output terminal of said flip-flop FF2, a low potential signal is outputted from the AND gate AD2, and since a transistor Q5 is turned off according to this low potential signal and thereby the driving of the relay RY2 for pump motor becomes stopped, its switch RY21 is opened, according to this, the triac TR1 is turned off whereby the driving of pump motor PM is stopped.

And, since a low potential signal outputted from said AND gate AD2 is inverted to a high potential signal at the inverter I5 whereby making the transistor Q6 to be on, the driving stop display lamp PL4 is lighted on whereby driving stop state of the pump motor PM is displayed, and since a low potential signal is outputted from the NOR gate NR1 according to the high potential signal outputted from the inverter I5, the timer T2 is reset and simultaneously high potential signal is outputted from the NAND gate ND4.

On the other hand, in case when an overload is applied at a state that the pump motor PM is driven as aforementioned, since a comparison voltage applied to the non-inversion input terminals of the comparators CP3 and CP4 whereby becoming higher than the reference voltages Vref2, Verf3, high potential signals are outputted from all of said comparators CP3 and CP4, according to this, a high potential signal which is an overload detection signal is outputted from the NAND gates ND1 and ND3 and simultaneously the timer T1 is released from the reset state. And, since a low potential signal outputted from the timer T1 is inverted to the high potential signal at the inverter I1 whereby it is inputted to the other input terminal of said NAND gate ND1, a low potential signal is outputted from said NAND gate ND1 whereby making the timer T1 to be triggered.

According to this, when a rated load is not applied to the pump motor PM within a time constant (approximately 10 seconds) according to the resistor R8 and capacitor C2 for said timer T1, that is, when a high potential signal which is an overload detection signal is outputted from the AND gate AD1 as aforementioned whereby a low potential signal is continuously outputted during the time constant of said resistor R8 and capacitor C2 from the NAND gate ND1, a high potential signal is outputted from said timer T1, and at the moment that this high potential signal is outputted, a low potential signal is applied through capacitor C4 to the inverter I2, and thereby a high potential signal is outputted from said inverter I2.

Therefore, at this moment, since a low potential signal is outputted from the NAND gate ND3 whereby being applied to the flip-flop FF1 as clock signal, a high potential signal is outputted to the output terminal Q of said flip-flop FF1, and since the transistor Q2 becomes conductive according to this high potential signal, the overload operating state display lamp PL1 is lighted on whereby becoming to display that it is in overload operating state, and at this moment, a low potential signal is outputted from the NOR gate NR2 according to the high potential signal outputted from said flip-flop FF1, according to this, as in the above description, the driving of the pump motor PM is stopped and simultaneously the driving stop display lamp PL4 is lighted on whereby becoming to display said driving stop.

On the other hand, when the driving stop switch SW1 is short-circuited at a state that the pump motor PM is normally driven as in the above description, since a low potential signal is applied to the flip-flop FF3 of the latch section 7 as clock signal, a high potential signal is outputted to the output terminal Q of said flip-flop FF3, and a low potential signal is outputted from the NOR gate NR2 according to this high potential signal, according to this, as in the above description, the driving of the pump motor PM is stopped and simultaneously the driving stop display lamp PL4 is lighted on whereby becoming to display said driving stop state.

On the other hand, when the re-start switch SW3 of the reset switch 8 is short-circuited at a state that driving of the pump motor PM is stopped as aforementioned, since the power supply of the power supply terminal Vcc is charged through a resistor R28 to a capacitor C10 whereby a low potential signal is applied to one input terminal of the AND gate AD3, a low potential signal is outputted to its output terminal whereby the flip-flops FF1, FF2 and FF3 of the latches 5, 6 and 7 become to be reset, according to this, as in the above description, the pump motor PM becomes driven again and simultaneously the normal operating state display lamp PL3 is lighted on whereby becoming to display the normal operating state of said pump motor PM.

And, when an electricity failure occurs during the driving of the pump motor, although the driving of said pump motor PM is stopped, in case when said electricity failure is terminated whereby the electric power is supplied again, as in the above description, since a low potential reset pulse signal is outputted from the reset section 8 whereby the flip-flops FF1, FF2 and FF3 of the reset sections 5, 6 and 7 become to be reset, the pump motor PM is driven again automatically.

As described above in detail, according to the present invention, in case when an overload or no-load is applied for more than a predetermined time period during the driving of the pump motor, since the driving of said pump motor is made to be automatically stopped, an overload and a no-load operation of the pump motor are prevented whereby using life time can be extended, and since in case when the environmental temperature of the pump motor is dropped below zero degree of centigrade, heater is energized whereby its environmental temperature is maintained over zero degree of centigrade, a breakdown of the pump motor can be previously prevented, and since the pressure switch is operated so as to make on or off the driving control voltage of the pump motor according to the pressure within the tube, there becomes to have effect capable of limiting the opening and closing noise.

What is claimed is:

1. An operation control circuit for a pump motor, comprising:
   an overload and no-load detecting section which develops a voltage whose amplitude is a function of the pump motor current and compares said developed voltage with an overload reference voltage and no-load reference voltage to generate an overload detection signal and a no-load detection signal, respectively;
   an overload driving count section including a first resistor and first capacitor which outputs an overload driving stop control signal when the overload detection signal is outputted for more than a first predetermined time period from said overload and no-load detecting section, the first predetermined time period being a function of a time constant of the first resistor and first capacitor;
   a no-load driving count section including a second resistor and a second capacitor which outputs a no-load driving stop control signal when the no-load detection signal is outputted for more than a second predetermined time period from said overload and no-load detection section, the second predetermined time period being a function of a time constant of the second resistor and second capacitor;
   a driving stop switch for generating a driving stop control signal;
   latch sections for latching respectively the overload driving stop control signal of said overload driving count section, the no-load driving stop control signal of no-load driving count section, and the driving stop control signal generated by the driving stop switch;
   a reset section including a re-start switch for resetting said latch sections by outputting a reset pulse signal either at an initial time that the power is supplied or at the time of actuation of the re-start switch; and
   a pump motor driving control section including a pressure switch for driving the pump motor according to the actuation of the pressure switch at the time of resetting said latch sections.

2. The operation control circuit according to claim 1, further comprising a pump environmental temperature detecting and heater energizing section which detects the environmental temperature of the pump motor, and when said detected temperature is dropped below zero degree of centigrade, energizes the heater.

3. The operation control circuit according to claim 1, further comprising an operating state display section for displaying overload operation, no-load operation, normal operation and driving stop state according to the output signal of the latch sections and the pump motor driving control signal of the pump motor driving control section.

4. The operation control circuit according to claim 1, wherein the overload and no-load detecting section includes:
   a current sensing coil, a resistor, a variable resistor and a first comparator for developing the voltage whose amplitude is a function of the pump motor current;
   a second comparator for generating the overload detection signal, the second comparator having a non-inverting input terminal and an inverting input terminal, the overload reference voltage applied to the inverting input signal;
   a third comparator for generating the no-load detection signal, the third comparator having an inverting and an non-inverting input terminal, the no-load reference voltage applied to the inverting input terminal;
   a charging circuit including a diode, a resistor and a capacitor for applying the voltage whose amplitude is a function of the pump motor current to the respective non-inverting input terminals of the second and third comparators; and
   an output circuit for the second and third comparators comprising an AND gate and a NOR gate arranged such that the overload detection signal is outputted from the AND gate and the no-load detection signal is outputted from said AND GATE.

5. The operation control circuit according to claim 1 wherein said overload driving count section includes:
   a timer having a reset terminal, an output terminal and a trigger terminal, the overload detection signal being applied to the reset terminal through the first resistor and first capacitor;
   a first NAND gate having first and second input terminals and an output terminal, the overload detection signal being applied to the first input terminal;
   means including an inverter, a resistor, and a capacitor for applying the output of the timer to the second input terminal of the first NAND gate, the output terminal of the first NAND gate being connected to the trigger terminal of the timer;
   a second NAND gate having first and second input terminals, the overload detection signal being connected to the first input terminal; and
   means including a capacitor, second and third resistors and an inverter for connecting the output terminal of the timer to the second input terminal of the second NAND gate.

6. The operation control circuit according to claim 1, wherein said no-load driving count section includes:
   a timer having a reset terminal, an output terminal and a trigger terminal, the no-load detection signal being applied to the reset terminal through the second resistor and second capacitor;
   a first NAND gate having first and second input terminals and an output terminal, the no-load detection signal being applied to the first input terminal;
   means including an inverter, a resistor, and a capacitor for applying the output of the timer to the second input terminal of the NAND gate, the output terminal of the first NAND gate being connected to the trigger terminal of the timer;
   a second NAND gate having first and second input terminals, the no-load detection signal being connected to the first input terminal; and
   means including a capacitor, second and third resistors and an inverter for connecting the output of the timer to the second terminal of the second NAND gate.

7. The operation control circuit according to claim 1, wherein the pump motor driving control section includes:
   a NOR gate having an output terminal and a plurality of input terminals connected to the latch sections;
   an AND gate having first and second input terminals, the output terminal of the NOR gate being connected to the first input terminal of the AND gate and the pressure switch being connected to the second input terminal of the AND gate and to a resistor;
   a transistor having its base connected to the output terminal of the AND gate; and
   a pump motor relay connected to the collector of the transistor.

* * * * *